(12) United States Patent
Onoda

(10) Patent No.: US 7,032,447 B2
(45) Date of Patent: Apr. 25, 2006

(54) DIAPHRAGM GAS METER

(76) Inventor: Hajime Onoda, 4-15-17, Komagome, Toshima-ku, Tokyo (JP)

( * ) Notice: Subject to any disclaimer, the term of this patent is extended or adjusted under 35 U.S.C. 154(b) by 0 days.

(21) Appl. No.: 11/037,839

(22) Filed: Jan. 18, 2005

(65) Prior Publication Data

US 2005/0155424 A1    Jul. 21, 2005

(30) Foreign Application Priority Data

Jan. 19, 2004   (JP)   ............... 2004-010728

(51) Int. Cl.
*G01F 3/20*   (2006.01)
(52) U.S. Cl. .................................................. 73/262
(58) Field of Classification Search ............... None
See application file for complete search history.

(56) References Cited

U.S. PATENT DOCUMENTS 4,796,676 A * 1/1989 Hendershot et al. ......... 73/49.2
5,939,638 A * 8/1999 Zovath et al. ................ 73/723
6,293,159 B1 * 9/2001 Kriesel et al. ........... 73/861.47

FOREIGN PATENT DOCUMENTS

| DE | 1 218 175   | 6/1966 |
| DE | 40 05 908   | 9/1991 |
| EP | 0 399 489 A2 | 5/1990 |
| EP | 0 399 489 A3 | 5/1990 |

OTHER PUBLICATIONS

European Search Report dated Jun. 17, 2005.

* cited by examiner

*Primary Examiner*—Harshad Patel
(74) *Attorney, Agent, or Firm*—Ohlandt, Greeley, Ruggiero & Perle LLP.

(57) ABSTRACT

In a gas meter, a measuring diaphragm is provided inside a measuring chamber, the measuring diaphragm is caused to reciprocate according to a gas pressure of gas flowing from a gas inflow port to the measuring chamber, and the reciprocation of the measuring diaphragm is interlocked with a valve mechanism and an integrating mechanism via a wing shaft and a crank mechanism. Here, the measuring diaphragm is formed in an elliptical shape which is horizontally long in the width direction of the gas meter.

13 Claims, 7 Drawing Sheets

DIAPHRAGM GAS METER

CROSS-REFERENCE TO RELATED APPLICATIONS

This application is based upon and claims the benefit of priority from prior Japanese Patent Application No. 2004-010728, filed Jan. 19, 2004, the entire contents of which are incorporated herein by reference.

BACKGROUND OF THE INVENTION

1. Field of the Invention

The present invention relates to a diaphragm gas meter which meters a gas flow rate or amount, and in particular to a diaphragm gas meter which can prevent pressure fluctuation from occurring to reduce pressure loss and can be reduced in size.

2. Description of the Related Art

FIGS. 7A and 7B are front views which schematically show an ordinary diaphragm gas meter 100. The diaphragm gas meter 100 is provided with a gas meter housing or main body 101, and the gas meter housing 101 is constituted by combining an upper case 102 and a lower case 103. The upper case 102 is provided with a gas inflow port 104 and a gas outflow port 105. The lower case 103 is provided with a measuring chamber 106, and the measuring chamber 106 is provided with a measuring diaphragm 107.

The measuring diaphragm 107 has a function which reciprocates according to gas pressure flowed from the gas inflow port 104 of the gas meter housing 101. The reciprocation of the measuring diaphragm 107 is transmitted to an interlocking mechanism 108 constituted of a crank mechanism and a valve mechanism accommodated in the upper case 102 via a wing shaft (not shown). The interlocking mechanism 108 is interlocked with an integration display section 109, on which an integrated value of an inflow gas amount calculated based upon motion of the measuring diaphragm 107.

The crank mechanism is provided with a large elbow metal and a small elbow metal. Reciprocating motion of the measuring diaphragm 107 is converted to a crank motion of the crank mechanism by rotational motion of the wing shaft. Motion of the crank mechanism is interlocked with the integration display section 109 via the interlocking mechanism 108. Such a gas meter is disclosed, for example, in Jpn. Pat. Appln. KOKAI Publication No. 5-164589.

The measuring diaphragm 107 is made of a flexible member such as a rubber. A front shape of the measuring diaphragm 107 is a circular shape as shown in FIG. 7A, or it is a rectangular shape or a rectangular shape with four corners rounded (hereinafter, "rounded rectangular shape"), as shown in FIG. 7B. A diaphragm plate (not shown) is attached to a central portion of the measuring diaphragm 107. An outer peripheral portion of the measuring diaphragm 107 is fixed to the lower case 103 forming the measuring chamber 106 in an air tight manner. The diaphragm plate is coupled to a wing shaft via a rotational arm (not shown). The measuring diaphragm 107 reciprocates according to gas pressure of gas which alternately flows into sections of the measuring chamber 106 which are defined on a surface side and a back surface side of the measuring diaphragm 107. The reciprocation is transmitted from the diaphragm plate to the wing shaft via the rotational arm as rotational motion.

In the measuring diaphragm 107 in the conventional diaphragm gas meter 100, however, rucks occur at four corners in one with a rectangular shape or a rounded rectangular shape in some cases, as shown in FIG. 7B. When stretching/shrinking of the rucks becomes resistive, smooth reciprocation of the measuring diaphragm is obstructed, which causes pressure fluctuation, resulting in large windage. When rucks occur in the measuring diaphragm, the measuring diaphragm can not always achieve constant measuring to a volume (one cycle volume) of gas which should be originally constant, which causes such a problem that a stable measuring performance required as a gas meter can not be attained.

In view of these circumstances, in order to solve the problem about the rucks occurring in the measuring diaphragm, a circular measuring diaphragm 107 has been developed, as shown in FIG. 7A. Rucks hardly occur in the circular measuring diaphragm 107 at a time of reciprocation, so that reciprocation of the measuring diaphragm is conducted smoothly. However, the circular measuring diaphragm 107 becomes smaller in area of a diaphragm front than the rectangular diaphragm or the rounded rectangular diaphragm due to a limited space in the gas meter, and one cycle volume of the former is therefore smaller than that of the latter.

Accordingly, when the amounts of gases passing through a gas meter with the former measuring diaphragm and a gas meter with the latter measuring diaphragm are equal to each other, namely, the flow rates in the both are equal to each other, the former measuring diaphragm is faster in diaphragm motion than the latter measuring diaphragm. In other words, the number of reciprocating motions in the former measuring diaphragm increases necessarily. The increase in the number will affect pressure loss of gas or durability of the gas meter adversely. When a discharge volume of gas in use of the circular measuring diaphragm is tried to be equal to that in use of the rectangular or rounded rectangular measuring diaphragm, the gas meter must be increased in height and width, which results in difficulty in shape compacting.

BRIEF SUMMARY OF THE INVENTION

An object of the present invention is to provide a diaphragm gas meter where rucks hardly occur in a measuring diaphragm and which can reduce pressure loss.

A diaphragm gas meter according to one aspect of the present invention comprises: a gas meter housing which has an inflow port for gas and an outflow port for gas; a measuring chamber which is provided inside the gas meter housing and has two gas chambers; a valve mechanism which alternately supplies gas introduced from the inflow port into the two gas chambers; an elliptical measuring diaphragm which is provided between the two gas chambers and partitions the gas chambers from each other in an air tight manner; and an interlocking mechanism which interlocks reciprocating motion of the measuring diaphragm with the valve mechanism and an integrating mechanism which measures a flow rate of gas.

A diaphragm gas meter according to another aspect of the present invention comprises: a gas meter housing which has an inflow port for gas and an outflow port for gas; a measuring chamber which is provided inside the gas meter housing and has two gas chambers; a valve mechanism which alternately supplies gas introduced from the inflow port into the two gas chambers; a measuring diaphragm which is provided between the two gas chambers to partition the gas chambers from each other in an air tight manner, and has, as a shape, a common portion constituted of overlapping portions of two ellipses defined by overlapping the ellipses with each other so as to cross longitudinal axes thereof; and an interlocking mechanism which interlocks reciprocating motion of the measuring diaphragm with the valve mechanism and an integrating mechanism which measures a flow rate of gas.

A diaphragm gas meter according to another aspect of the present invention comprises: a gas meter housing which has an inflow port for gas and an outflow port for gas; a measuring chamber which is provided inside the gas meter housing and has two gas chambers: a valve mechanism which alternately supplies gas introduced from the inflow port into the two gas chambers; a measuring diaphragm which is provided between the two gas chambers to partition the gas chambers from each other in an air tight manner, and has, as a shape, as a common portion constituted of overlapping portions of an ellipse and a circle, the circle having a diameter which is longer than a minor axis of the ellipse and shorter than a major axis thereof, which are defined by crossing the ellipse and the circle in an overlapping manner; and an interlocking mechanism which interlocks reciprocating motion of the measuring diaphragm with the valve mechanism and an integrating mechanism which measures a flow rate of gas.

According to the invention, pressure loss can be reduced by preventing rucks from occurring in the measuring diaphragm, and a height size of the gas meter itself can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1A:
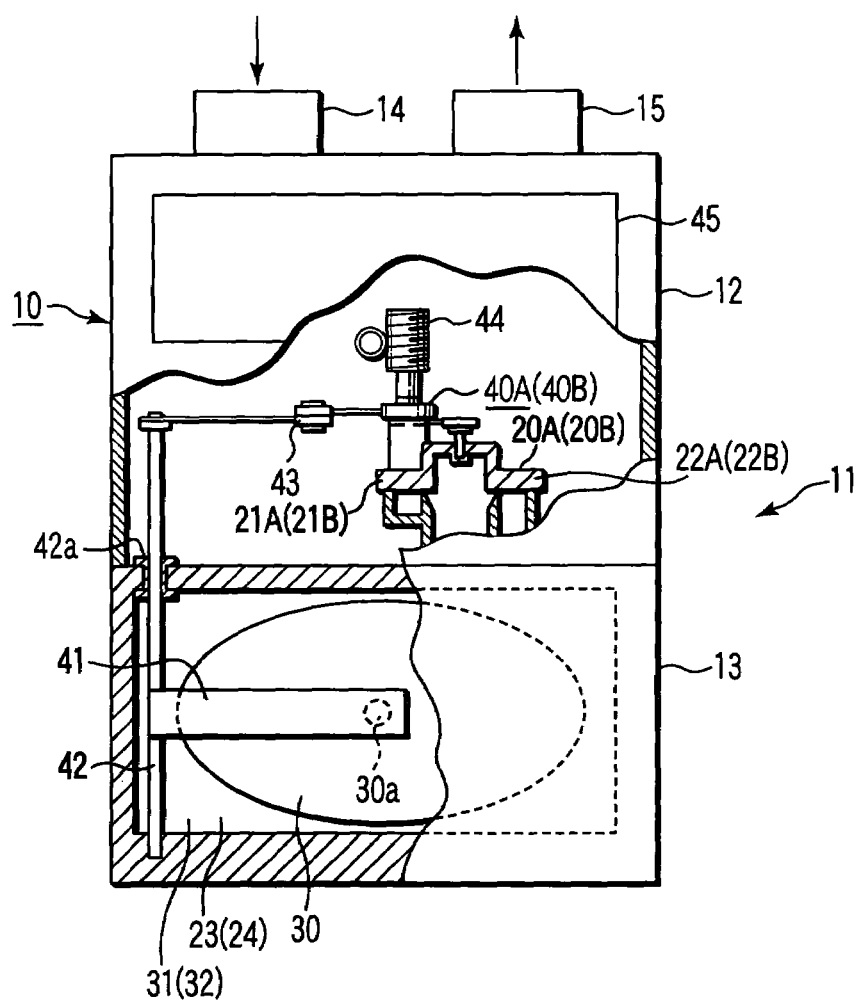
FIG. 1A is a front view schematically showing a diaphragm gas meter according to a first embodiment of the present invention.
Figure 1B:
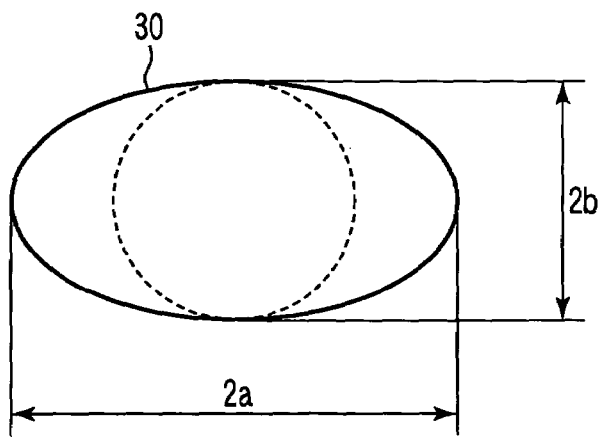
FIG. 1B is a front view schematically showing a measuring diaphragm assembled in the diaphragm gas meter according to the first embodiment.

FIG. 1A is a front view schematically showing a diaphragm gas meter according to a first embodiment of the present invention, and FIG. 1B is a front view schematically showing a measuring diaphragm assembled in the diaphragm gas meter according to the first embodiment.

A diaphragm gas meter 10 is provided with a gas meter main body 11 serving as a housing, and the gas meter main body 11 is formed by combining an upper case 12 and a lower case 13. The upper case 12 is provided on its case face with two holes, and the holes are formed with a gas inflow port 14 and a gas outflow port 15, respectively. A pair of valve mechanisms 20A and 20B are received in the upper case 12. The valve mechanism 20A is provided with two valves 21A, 22A, and the valve mechanism 20B is provided with two valves 21B, 22B. Further, the valve mechanism 20A is configured to be driven by an interlocking mechanism 40B, and the valve mechanism 20B is configured to be driven by an interlocking mechanism 40A, as described below.

The lower case 13 is provided with a measuring chamber 23 and a measuring chamber 24, and the measuring chambers are respectively connected with the above-described valve mechanisms 20A, 20B. Each of the measuring chamber 23 and the measuring chamber 24 has two gas chambers. The gas chambers of the measuring chamber 23 are connected with the valves 21A, 22A of the valve mechanism 20A, and the gas chambers of the measuring chamber 24 are connected with the valves 21B, 22B of the valve mechanism 20B. The gas chambers of the measuring chamber 23 are closed air-tightly by closing actions of the valves 21A, 22A, and the gas chambers of the measuring chamber 24 are closed air-tightly by closing actions of the valves 21B, 22B. Gas can enter/exit from the gas chambers of the measuring chambers 23, 24 by opening the valves 21A, 22A, and 21B, 22B at a predetermined timing and causing the gas chambers to be communicated with the gas inflow port 14 or the gas outflow port 15.

The measuring chambers 23, 24 are formed to be aligned in an anteroposterior direction (a direction orthogonal to a sheet face of a drawing for FIG. 1A) of the lower case 13. The two measuring chambers 23, 24 are substantially identical to each other in volume and structure. In the following, explanation about the measuring chamber 24 will be omitted and only explanation about the measuring chamber 23 will be made.

A measuring diaphragm 30 is provided in the measuring chamber 23 so as to divide the measuring chamber 23 in an anteroposterior direction (a direction orthogonal to a sheet face of a drawing for FIG. 1A). That is, the measuring chamber 23 is partitioned by the measuring diaphragm 30, so that a first gas chamber 31 is formed at a front side (at this side of the drawing for FIG. 1A) of the measuring diaphragm 30 and a second gas chamber 32 is formed on a rear side (at a depth side of the drawing for FIG. 1A) of the measuring diaphragm 30. The first gas chamber 31 and the second gas chamber 32 are air-tightly partitioned from each other by the measuring diaphragm 30.

When the first gas chamber 31 is connected to the gas inflow port 14 by the opening action of the valve 21A, the second gas chamber 32 is connected to the gas outflow port 15. When the second gas chamber 32 is connected to the gas inflow port 14 by the opening action of the valve 22A, the first gas chamber 31 is connected to the gas outflow port 15.

An outer peripheral portion of the measuring diaphragm 30 is air-tightly fixed to the lower case 13 forming the measuring chamber 23. Incidentally, fixation of the measuring diaphragm 30 is made with such slack that the measuring diaphragm 30 slightly moves in an anteroposterior direction. The measuring diaphragm 30 is made of a flexible member such as a rubber. Therefore, the measuring diaphragm 30 can moves by a fixed distance in an anteroposterior direction. Specifically, when gas is fed into the first gas chamber 31, the measuring diaphragm 30 is pushed out inside the second gas chamber 32 by gas pressure of the fed gas. On the contrary, when gas is fed into the second gas chamber 32, the measuring diaphragm 30 is pushed out inside the first gas chamber 31 by gas pressure of the fed gas. That is, the measuring diaphragm 30 repeats reciprocating motion between the first gas chamber 31 and the second gas chamber 32 by alternately feeding gas into the first and second gas chambers 31, 32.

A diaphragm plate 30a is attached to a central portion of the measuring diaphragm 30. The interlocking mechanism 40A is coupled to the measuring diaphragm 30 via the diaphragm plate 30a. The interlocking mechanism 40A is provided with a rotational arm 41, a wing shaft 42, and a crank mechanism 43. The crank mechanism 43 is provided with a large elbow metal and a small elbow metal. Incidentally, the interlocking mechanism 40B having the same configuration as the interlocking mechanism 40A is provided at the side of the measuring chamber 24.

One end of the rotational arm 41 is attached to the diaphragm plate 30a. The other end of the rotational arm 41 is attached to an outer peripheral face of the wing shaft 42. The wing shaft 42 is provided in a standing manner such that an axial direction thereof is vertical (in a vertical direction in FIG. 1A), and is rotatably supported by a bearing 42a. Thereby, when the measuring diaphragm 30 reciprocates, the end of the rotational arm 41 fixed to the measuring diaphragm 30 oscillates in an anteroposterior direction and the other end of the rotational arm 41 rotationally moves the wing shaft 42.

An end of the wing shaft 42 which is opposed to the end thereof to which the rotational arm 41 is attached is coupled to a crank mechanism 43. Rotational motion of the wing shaft 42 is converted to rotational motion of a crankshaft constituting the crank mechanism 43 through crank motion of the crank mechanism 43. The rotational motion rotates a worm gear 44 connected to the crankshaft.

On the other hand, the upper case 12 is provided with an integration display section 45 serving as an integrating mechanism for displaying an integrated value of a flow amount of gas which has passed through the gas meter. Rotation of the worm gear 44 is transmitted to the integration display section 45 through a transmission mechanism (not shown) and the integration display section 45 displays an integrated value of the flow amount of gas.

The crank mechanism 43 of the interlocking mechanism 40A is further coupled to the valve mechanism 20B at the measuring chamber 24 side. That is, the crank mechanism 43 of the interlocking mechanism 40A is timed so as to produce a state that, when the valve 21B is in a closing position, the valve 22B is in an opened position so that gas is fed into a second gas chamber (not shown) of the measuring chamber 24 and produce a state that, when the valve 22B is in a closed position, the valve 21B is in an opened position so that gas is fed into a first gas chamber (not shown) of the measuring chamber 24. In other words, when the valve 21A is opened so that gas is fed into the first gas chamber 31 of the measuring chamber 23, the crank mechanism 43 of the interlocking mechanism 40A transmits motion such that, regarding reciprocating motion of the measuring diaphragm 30 inside the measuring chamber 23, the measuring diaphragm 30 moves in a direction in which the valve 22B of the measuring chamber 24 is opened. On the contrary, when the valve 22A is opened so that gas is fed into the second gas chamber 32 at the measuring chamber 23 side, the crank mechanism 43 transmits motion such that, regarding reciprocating motion of the measuring diaphragm 30 inside the measuring chamber 23, the measuring diaphragm 30 moves in a direction in which the valve 21B at the measuring chamber 24 side is opened.

On the other hand, the interlocking mechanism 40B at the measuring chamber 24 side is also driven by reciprocating motion of the measuring diaphragm 30 in the measuring chamber 24 in accordance with the same principle, and further the crank mechanism 43 of the interlocking mechanism 40B activates the valve mechanism 20A at the measuring chamber 23 side.

That is, the measuring diaphragm 30 in either one of the measuring chambers 23 and 24 always reciprocates, thereby continuing to apply rotational power to the crank mechanism 43 without stopping. In other words, as far as gas flows in the diaphragm gas meter 10, the crank mechanism 43 continues to operate or move without imparting any external force other than gas.

The measuring diaphragm 30 assembled into the measuring chamber 23 is made of a flexible member such as a rubber member and is formed in an elliptical shape which is horizontally long in a horizontal direction (in a width direction in FIG. 1A) of the diaphragm gas meter 10. When a major axis of the measuring diaphragm 30 is represented as $2a$ and a minor axis thereof is represented as $2b$, a relationship of $1>2b/2a$ is obtained. An area S of the elliptical shape is expressed with an expression of $S=\pi ab$. For example, if $a=2b$, $S=2\pi b^2$ is obtained. Since an area of a circular diaphragm (shown with a broken line) with a diameter of $2b$ is expressed with $\pi b^2$, the horizontally long measuring diaphragm 30 becomes double the circular diaphragm (shown with a broken line) in discharge volume, when both the diaphragm have the same stroke.

According to the diaphragm gas meter 10 according to the first embodiment, the measuring diaphragm 30 can be constituted so as to make occurrence of rucks hard, reduce pressure loss, and reduce a height size of the diaphragm gas meter 10, as compared with the conventional rectangular or rounded rectangular diaphragm. Since the measuring diaphragm 30 becomes horizontally longer than the conventional circular diaphragm, the wing shaft 42 for taking out reciprocating motion of the measuring diaphragm 30 can be arranged at a position apart from the center of the measuring chamber 23, as shown in FIG. 1A. Accordingly, the rotational arm 41 becomes long, so that a driving force for driving the valve mechanism 20 can be increased utilizing a rotational torque of the wing shaft 42.

Figure 2A:
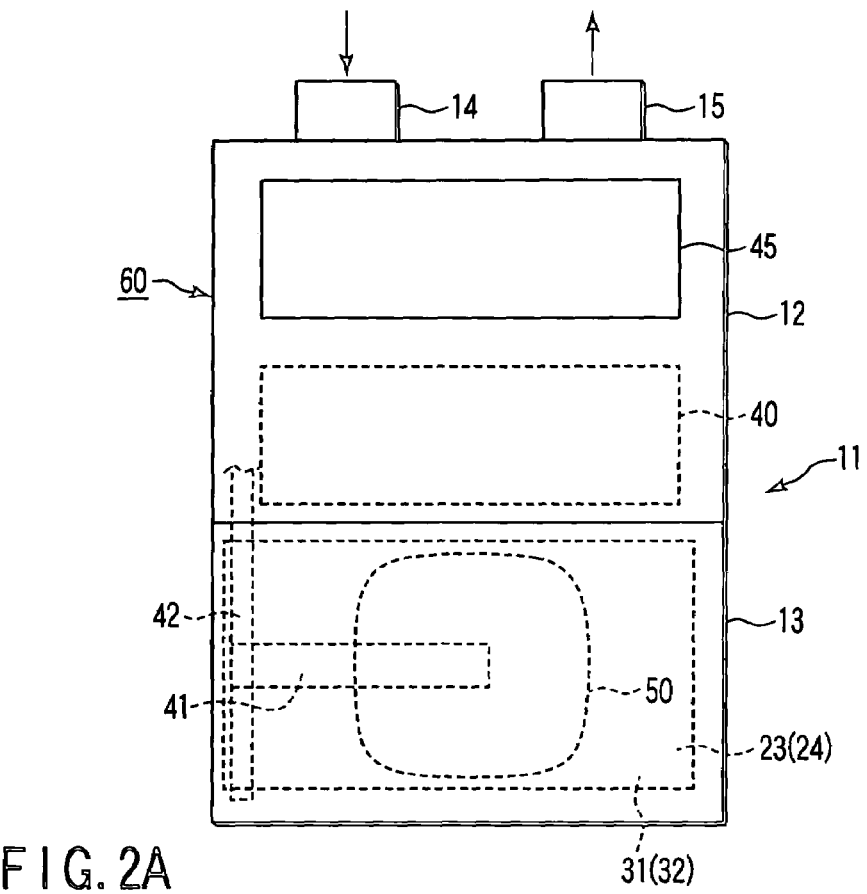
FIG. 2A is a front view schematically showing a diaphragm gas meter according to a second embodiment of the present invention.
Figure 2B:
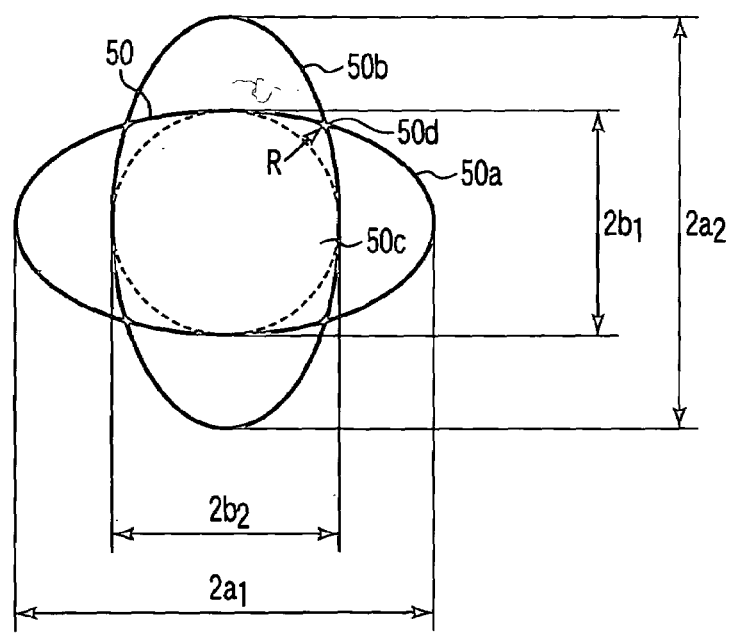
FIG. 2B is a front view schematically showing a measuring diaphragm assembled in the diaphragm gas meter according to the second embodiment.

FIGS. 2A and 2B are views showing a diaphragm gas meter 60 according to a second embodiment of the present invention. Constitutions or members of the diaphragm gas meter 60 which have the same functions as those of the diaphragm gas meter 10 according to the first embodiment will be attached with the same reference numerals used in the diaphragm gas meter 10 and explanation thereof will be omitted. In FIG. 2A, the crank mechanism 43 and the worm gear 44 are illustratively shown in an interlocking mechanism 40 collectively.

A shape of a measuring diaphragm 50 is defined by orthogonally crossing a horizontally long ellipse 50a which is long in a horizontal direction (in left and right directions in FIG. 2A) of the diaphragm gas meter 60 and a vertically long ellipse 50b which is long in a vertical direction (in upward and downward directions in FIG. 2A) of the diaphragm gas meter 60 in an over-lapping manner to define overlapping portions thereof as a common portion 50c and rounding corner portions 50d formed at four corners of the common portion 50c.

The shape of the measuring diaphragm 50 is increased in area by regions corresponding to the corner portions 50d formed at the four corners of the common portion 50c, as compared with the circular diaphragm (shown with a broken line). That is, a discharge volume can be increased correspondingly.

An area S of an overlapping portion of two ellipses is expressed as follows:

$$S=2a_1b_1 [\sin^{-1}x_1/a_1+x_1(1-x_1^2/a_1^2)^{1/2}/a_1] +2a_2b_2 [\cos^{-1}x_1/b_2-x_1(1-x_1^2/b_2^2)^{1/2}/b_2]$$

here, $x_1=a_1b_2[(a_2^2-b_1^2)/(a_1^2a_2^2-b_1^2b_2^2)]^{1/2}$

When two equal ellipses are used, $S=4ab \tan^{-1}b/a$, as $a_1=a_2$ and $b_1=b_2$. Here, for example, when $a=2b$, $S=3.71b^2$ can be obtained. Since an area of the circular diaphragm (shown with the broken line) with a radius of b is $\pi b^2$, when the measuring diaphragm 50 and the circular diaphragm have the same stroke, the discharge volume obtained by the former becomes 1.18 times that obtained by the latter (strictly speaking, an area of the portions removed by rounding should be included, but it may be omitted here, because the area is very small). When the same discharge volume is set to the circular diaphragm and the measuring diaphragm 50, the latter can be reduced in occupation area, as compared with the former.

According to the diaphragm gas meter 60 according to the second embodiment, rucks hardly occur in the measuring diaphragm thereof as compared with the conventional rectangular or rounded rectangular shape diaphragm, pressure loss can be reduced, and the measuring volume can be increased without increasing the height size of the gas meter.

In the diaphragm gas meter 60, such a constitution is employed that the small horizontally long ellipse 50a and the large vertically long ellipse 50b are orthogonal to each other in an overlapping manner, but ellipses with the same size may be orthogonal to each other. Such a constitution can be generally employed that ellipses with different eccentricities or the same eccentricity are orthogonal to each other.

Figure 3A:
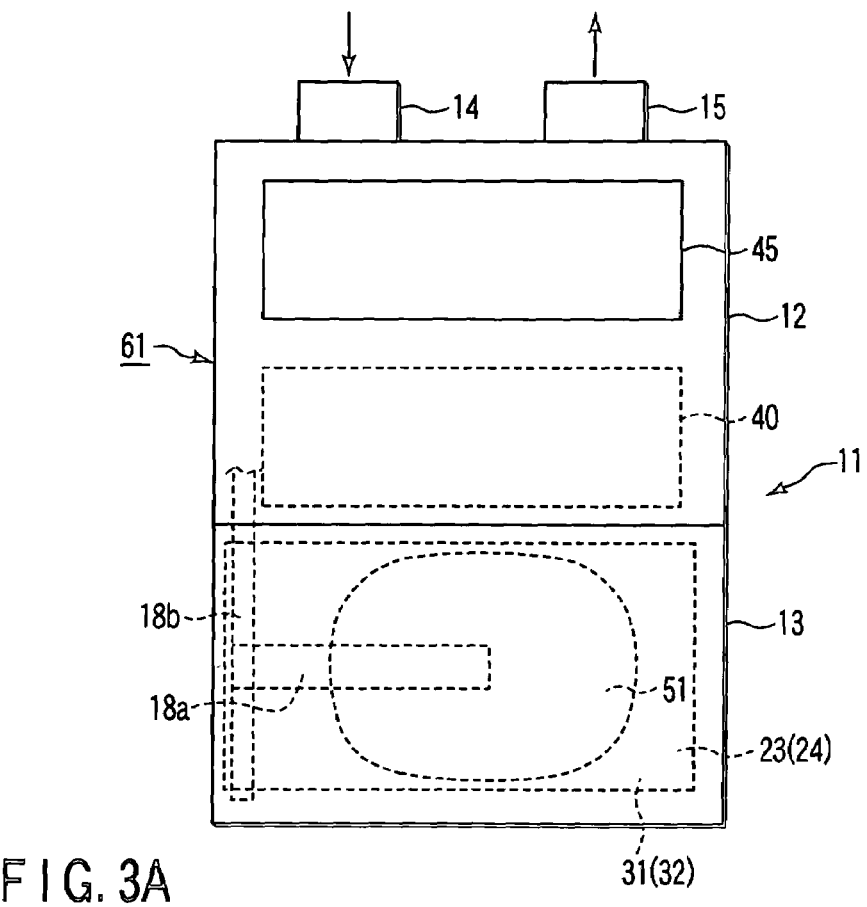
FIG. 3A is a front view schematically showing a diaphragm gas meter according to a third embodiment of the present invention.
Figure 3B:
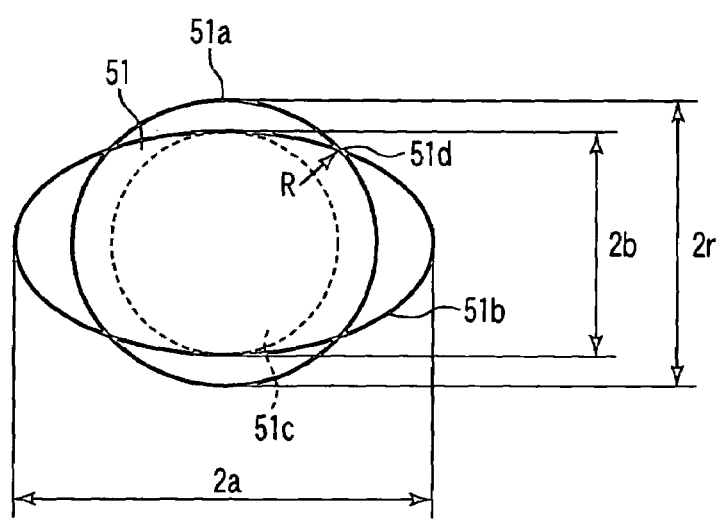
FIG. 3B is a front view schematically showing a measuring diaphragm assembled in the diaphragm gas meter according to the third embodiment.

FIGS. 3A and 3B are views showing a diaphragm gas meter 61 according to a third embodiment of the present invention. Constitutions or members of the diaphragm gas meter 61 which have the same functions as those of the diaphragm gas meter 10 according to the first embodiment will be attached with the same reference numerals used in the diaphragm gas meter 10 and explanation thereof will be omitted. In FIG. 3A, the crank mechanism 43 and the worm gear 44 are illustratively shown in an interlocking mechanism 40 collectively.

A shape of a measuring diaphragm 51 is defined by crossing a circle 51a and a horizontally long ellipse 51b which is long in a horizontal direction (in left and right directions in FIG. 3A) of the diaphragm gas meter 61 in an overlapping manner to define the overlapping portions thereof as a common portion 51c and rounding corner portions 51d formed at four corners of the common portion 51c.

Since the shape of the measuring diaphragm 51 is increased in area by areas corresponding to regions defined between a line 51a defining the circular member and a broken line defining a circular diaphragm on both left and right sides of the common portion 51c, as compared with the area of the circular diaphragm (shown with the broken line), a discharge volume of the measuring diaphragm 51 can be increased correspondingly.

An area S of an overlapping portion of a circle with a diameter of 2r and an ellipse is expressed as follows:

$$S=2ab [\sin^{-1}x_1/a+x_1(1-x_1^2/a^2)^{1/2}/a]+2r^2 [\cos^{-1}x_1/r-x_1(1-x_1^2/r^2)^{1/2}/r]$$

here, $a \geq r \geq b$ and $x_1=a[(r^2-b^2)/(a^2-b^2)]^{1/2}$

For example, when $a=2b$ and $r=2b/1.5$, $S=4.63b^2$ can be obtained. Since an area of the circular diaphragm (shown with the dotted line) with a radius of b is $\pi b^2$, when the measuring diaphragm 51 and the circular diaphragm have the same stroke, the discharge volume obtained by the former becomes 1.47 times that obtained by the latter (strictly speaking, an area of the portions removed by rounding should be included, but it may be omitted here, because the area is very small). When the same discharge volume is set to the circular diaphragm and the measuring diaphragm 51, the latter can be-reduced in occupation area as compared with the former.

According to the diaphragm gas meter 61 according to the third embodiment, rucks hardly occur in the measuring diaphragm thereof as compared with the conventional rectangular or rounded rectangular shape diaphragm, pressure loss can be reduced, and the measuring volume can be increased without increasing the height size of the gas meter.

Figure 4A:
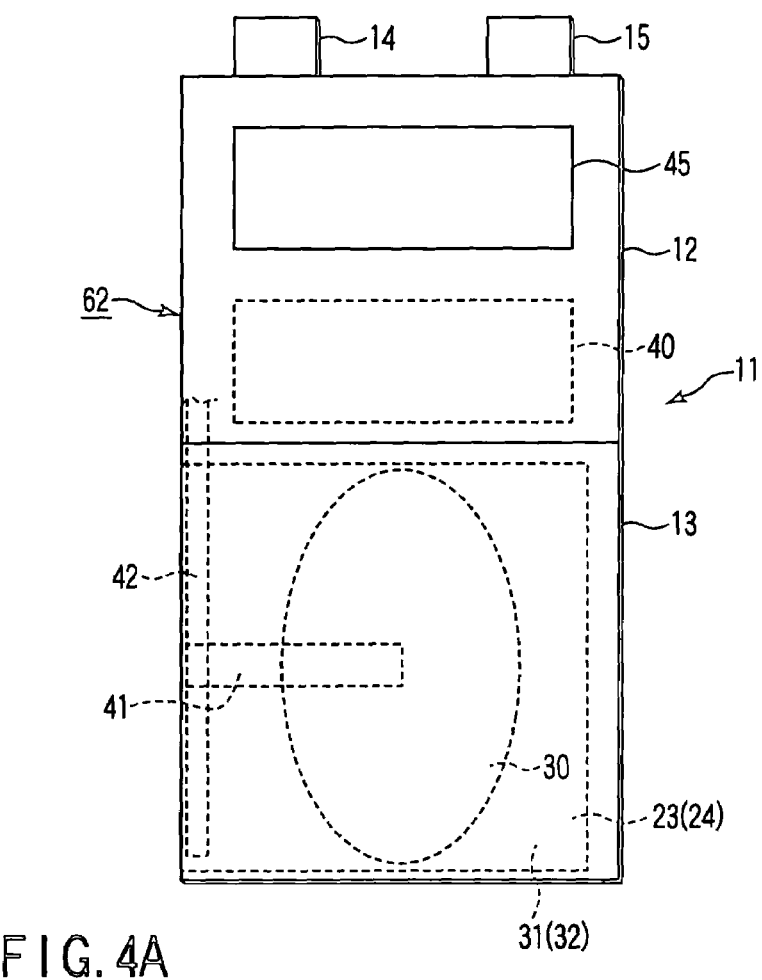
FIG. 4A is a front view schematically showing a diaphragm gas meter according to a fourth embodiment of the present invention.
Figure 4B:
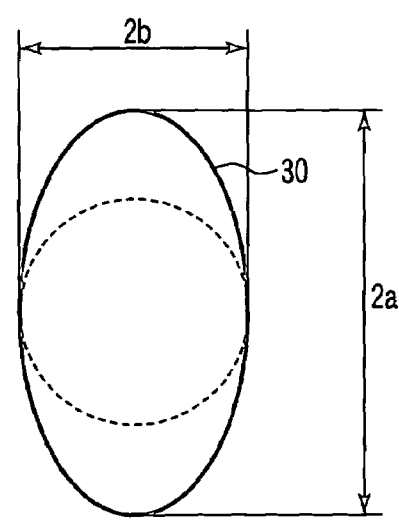
FIG. 4B is a front view schematically showing a measuring diaphragm assembled in the diaphragm gas meter according to the fourth embodiment.

FIGS. 4A and 4B are views showing a diaphragm gas meter 62 according to a fourth embodiment of the present invention. FIG. 4A is a schematic front view of the diaphragm gas meter 62, and FIG. 4B is a schematic front view of a measuring diaphragm. Constitutions or members of the diaphragm gas meter 62 which have the same functions as those of the diaphragm gas meter 10 according to the first embodiment will be attached with the same reference numerals used in the diaphragm gas meter 10 and explanation thereof will be omitted. In FIG. 4A, the crank mechanism 43 and the worm gear 44 are illustratively shown in an interlocking mechanism 40 collectively.

The measuring diaphragm 30 assembled into the measuring chamber 23 is made of a flexible member such as a rubber member and is formed in a vertically long elliptical shape which is long in a vertical direction (in a vertical direction in FIG. 4A) of the diaphragm gas meter 62. When a major axis of the measuring diaphragm 30 is represented as 2a and a minor axis thereof is represented as 2b, a relationship of $1>2b/2a$ is obtained. An area S of the elliptical shape is expressed with an expression of $S=\pi ab$.

For example, if "a"=2b, $S=2\pi b^2$ is obtained. Since a circular diaphragm (shown with a broken line) with a diameter of 2b is expressed with $\pi b^2$, the vertically long measuring diaphragm 30 becomes double the circular diaphragm (shown with a broken line) in discharge volume, when both the diaphragm have the same stroke.

According to the diaphragm gas meter 62 according to the fourth embodiment, rucks hardly occur in the measuring diaphragm 30 thereof as compared with the conventional rectangular or rounded rectangular shape diaphragm, and pressure loss can be reduced. The diaphragm gas meter 62 can be reduced in size in. the horizontal direction (in left and right directions in FIG. 4A), and an installation for the diaphragm gas meter 62 can also be reduced. Since the measuring diaphragm 30 according to the fourth embodiment is made longer in the vertical direction than the conventional circular diaphragm, the wing shaft 42 for taking out reciprocating motion of the measuring diaphragm 30 becomes near to the center of the measuring chamber 23, as shown in FIG. 4A, so that the rotational arm 41 is reduced in length. However, when the valve mechanism 20 is constituted of a rotary valve or the like, since it is unnecessary to increase a driving force for driving the valve utilizing a rotational torque of the wing shaft 42, the measuring diaphragm 30 according to the fourth embodiment is effective.

As modification (not shown) of the third and fourth embodiments, a shape of a measuring member provided in the measuring chamber may be defined by crossing a vertically long ellipse which is long in a direction of height of a gas meter and a circle in an overlapping manner to define overlapping portions thereof as a common portion and rounding corner portions formed at four corners of the common portion.

Figure 5:
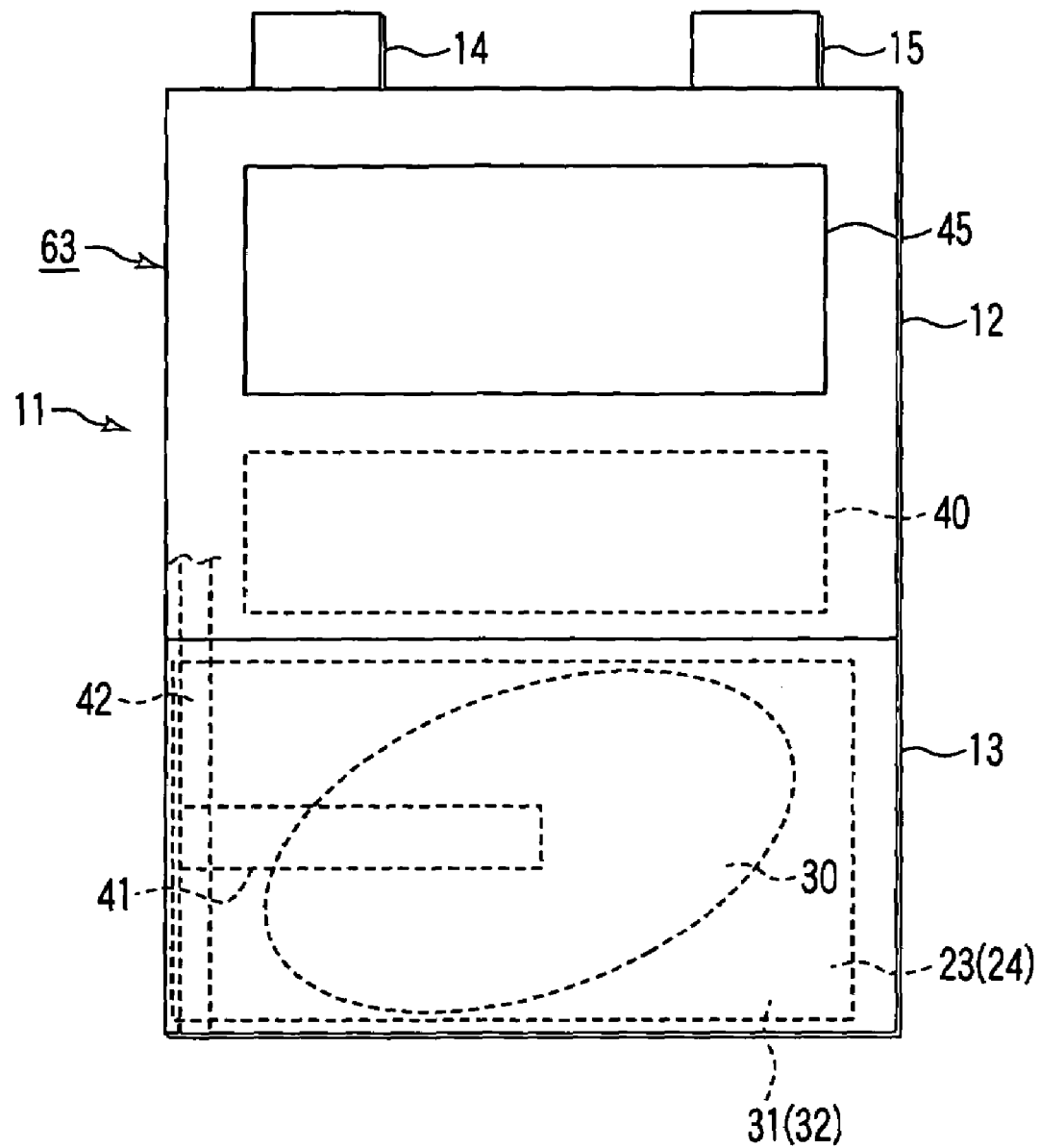
FIG. 5 is a front view schematically showing a diaphragm gas meter according to a fifth embodiment of the present invention.

FIG. 5 is a front view schematically showing a diaphragm gas meter 63 according to a fifth embodiment of the present invention. Constitutions or members of the diaphragm gas meter 63 which have the same functions as those of the diaphragm gas meter 10 according to the first embodiment will be attached with the same reference numerals used in the diaphragm gas meter 10 and explanation thereof will be explained. In FIG. 5, the crank mechanism 43 and the worm gear 44 are illustratively shown in an interlocking mechanism 40 collectively.

A measuring diaphragm 30 assembled in the measuring chamber 23 is the same elliptical measuring diaphragm 30 as the first or fourth embodiment. The measuring diaphragm 30 is disposed in the measuring chamber 23 such that a major axis (corresponding to a longitudinal direction) thereof is inclined. That is, when the measuring chamber 23 is rectangular in front view thereof, the measuring diaphragm 30 is disposed in a diagonal direction thereof. In this embodiment, an inclination angle of the measuring diaphragm 30 is set to 30°, but the angle may be set to any angle and it is not limited to specific angles. According to this embodiment, advantages or merits similar to those in the first embodiment can be attained.

Figure 6:
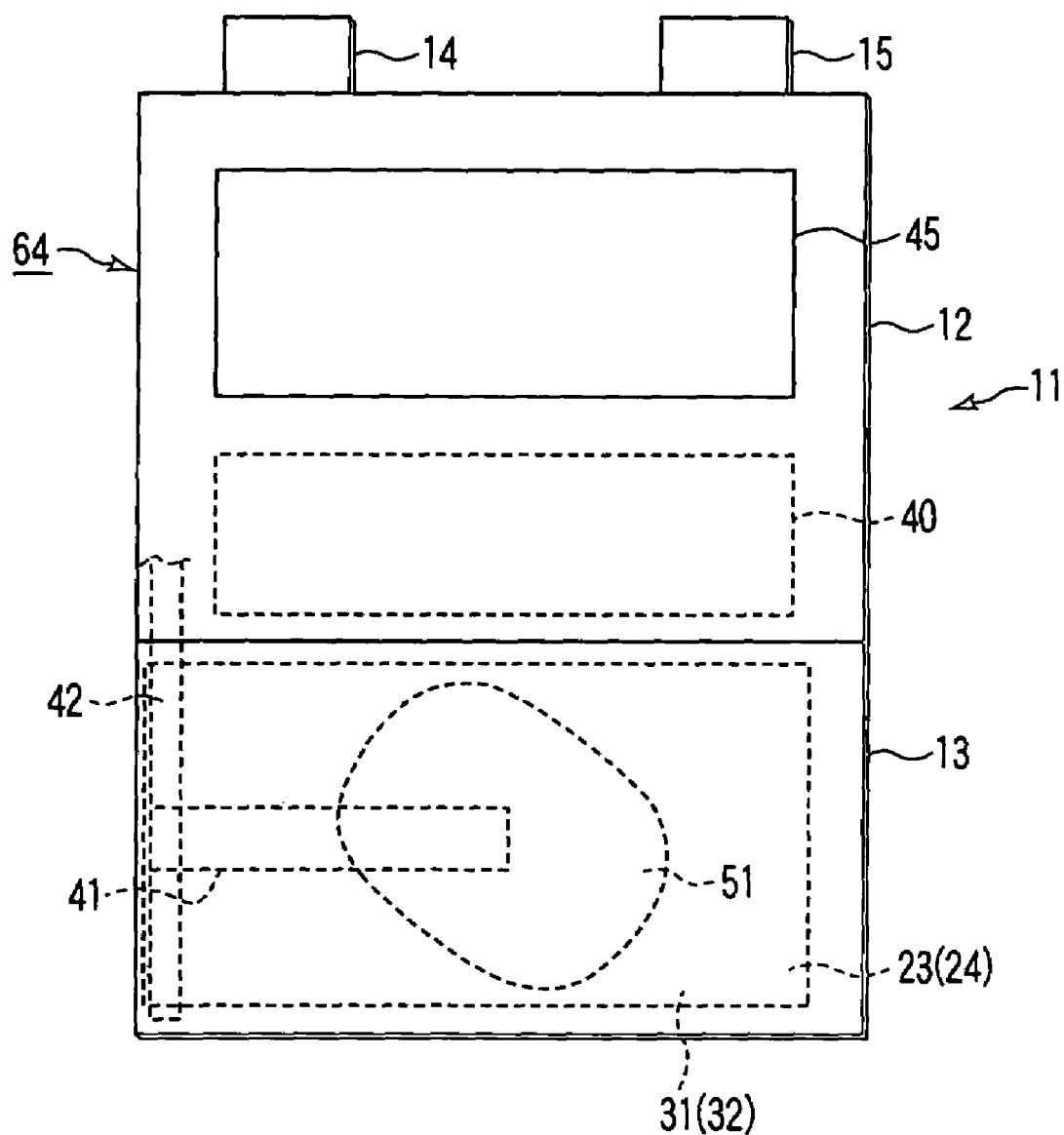
FIG. 6 is a front view schematically showing a diaphragm gas meter according to a sixth embodiment of the present invention.
Figure 7A:
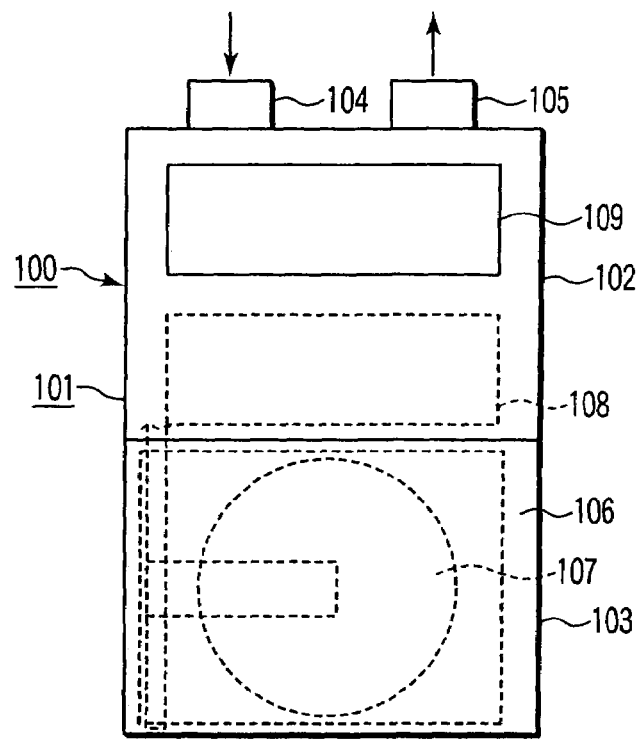
FIG. 7A is a front view schematically showing one example of a diaphragm gas meter using a circular measuring diaphragm.
Figure 7B:
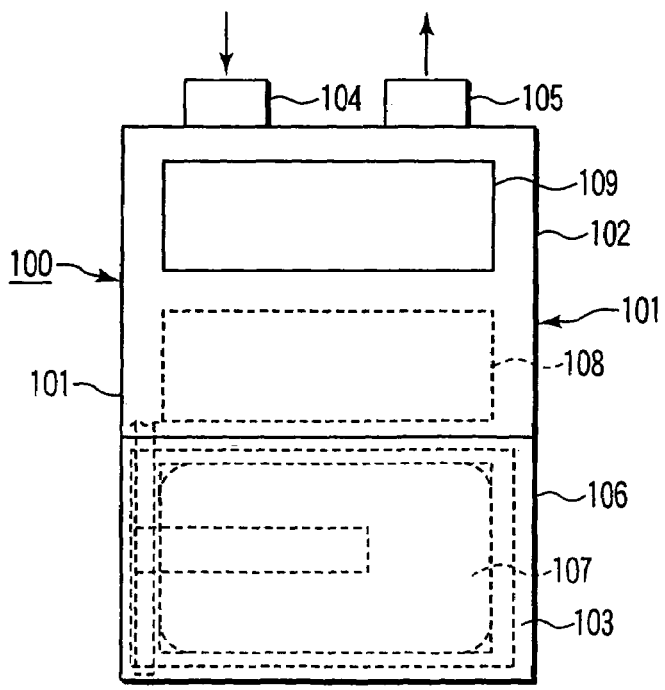
FIG. 7B is a front view schematically showing one example of a diaphragm gas meter using a rectangular/rounded rectangular measuring diaphragm.

FIG. 6 is a schematic front view of a diaphragm gas meter 64 according to a sixth embodiment of the present invention. Constitutions or members of the diaphragm gas meter 64 which have the same functions as those of the diaphragm gas meter 10 according to the first embodiment will be attached with the same reference numerals used in the diaphragm gas meter 10 and explanation thereof will be explained. In FIG. 6, the crank mechanism 43 and the worm gear 44 are illustratively shown in an interlocking mechanism 40 collectively.

A measuring diaphragm 51 assembled in the measuring chamber 23 is the same measuring member 51 as the third embodiment, but it is disposed in the measuring chamber 23 such that a major axis (a long diameter) thereof is inclined. That is, when the measuring chamber 23 is rectangular in front view thereof, the measuring diaphragm 51 is disposed in a diagonal direction thereof. In this embodiment, an inclination angle of the measuring diaphragm 51 is set to 45°, but the angle may be set to any angle and it is not limited to specific angles. According to this embodiment, advantages or merits similar to those in the third embodiment can be attained.

In this embodiment, the case that the measuring diaphragm 51 used in the third embodiment is disposed in the measuring chamber 23 such that the major axis (long diameter) thereof is inclined, but such a constitution may be employed that the measuring diaphragm 50 used in the second embodiment is disposed in the measuring chamber 23 in an inclination manner.

In each of the second, third, and sixth embodiments, the measuring diaphragm has the rounded corners, but such a constitution may be employed that the corners of the measuring diaphragm are not rounded.

The present invention is not limited to the above embodiments, but it may be embodied by modifying respective constituent elements without deviating from the gist of the invention. The invention may be devised variously by combining a plurality of constituent elements disclosed in the above embodiments properly. For example, some constituent elements may be deleted from all the constituent elements shown in the embodiments. Further, different constituent elements included in different embodiments may be combined properly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diaphragm gas meter comprising:
    a gas meter housing which has an inflow port for gas and an outflow port for gas;
    a measuring chamber which is provided inside the gas meter housing and has two gas chambers;
    a valve mechanism which alternately supplies gas introduced from the inflow port into the two gas chambers;
    an elliptical measuring diaphragm which is provided between the two gas chambers and partitions the gas chambers from each other in an air tight manner; and
    an interlocking mechanism which interlocks reciprocating motion of the measuring diaphragm with the valve mechanism and an integrating mechanism which measures a flow rate of gas.

2. A diaphragm gas meter according to claim 1, wherein the interlocking mechanism comprises:
    a diaphragm plate mounted to the measuring diaphragm;
    a wing shaft which is provided to be rotatable about a central shaft thereof and drives the valve mechanism and the integrating mechanism; and
    a rotational arm whose one end is mounted to the diaphragm plate, while the other end thereof being mounted to the wing shaft, and which transmits reciprocating motion of the measuring diaphragm as rotational motion of the wing shaft, and such an arrangement is made that a longitudinal direction of the measuring diaphragm and a longitudinal direction of the rotational arm are parallel to each other or form an acute angle.

3. A diaphragm gas meter comprising:
a gas meter housing which has an inflow port for gas and an outflow port for gas;
a measuring chamber which is provided inside the gas meter housing and has two gas chambers;
a valve mechanism which alternately supplies gas introduced from the inflow port into the two gas chambers;
a measuring diaphragm which is provided between the two gas chambers to partition the gas chambers from each other in an air tight manner, and has, as a shape, a common portion constituted of overlapping portions of two ellipses defined by overlapping the ellipses with each other so as to cross longitudinal axes thereof; and
an interlocking mechanism which interlocks reciprocating motion of the measuring diaphragm with the valve mechanism and an integrating mechanism which measures a flow rate of gas.

4. A diaphragm gas meter according to claim 3, wherein the interlocking mechanism comprises:
a diaphragm plate mounted to the measuring diaphragm;
a wing shaft which is provided to be rotatable about a central shaft thereof and drives the valve mechanism and the integrating mechanism; and
a rotational arm whose one end is mounted to the diaphragm plate, while the other end thereof being mounted to the wing shaft, and which transmits reciprocating motion of the measuring diaphragm as rotational motion of the wing shaft, and
such an arrangement is made that a major axis direction of the measuring diaphragm and a longitudinal direction of the rotational arm are parallel to each other or form an acute angle.

5. A gas meter according to claim 4, wherein
four corners of the common portion are rounded.

6. A gas meter according to claim 3, wherein
four corners of the common portion are rounded.

7. A diaphragm gas meter comprising
a gas meter housing which has an inflow port for gas and an outflow port for gas;
a measuring chamber which is provided inside the gas meter housing and has two gas chambers:
a valve mechanism which alternately supplies gas introduced from the inflow port into the two gas chambers;
a measuring diaphragm which is provided between the two gas chambers to partition the gas chambers from each other in an air tight manner, and has, as a shape, as a common portion constituted of overlapping portions of an ellipse and a circle, the circle having a diameter which is longer than a minor axis of the ellipse and shorter than a major axis thereof, which are defined by crossing the ellipse and the circle in an overlapping manner; and
an interlocking mechanism which interlocks reciprocating motion of the measuring diaphragm with the valve mechanism and an integrating mechanism which measures a flow rate of gas.

8. A diaphragm gas meter according to claim 7, wherein the interlocking mechanism comprises:
a measuring plate mounted to the measuring diaphragm;
a wing shaft which is provided to be rotatable about a central shaft thereof and drives the valve mechanism and the integrating mechanism; and
a rotational arm whose one end is mounted to the diaphragm plate, while the other end thereof being mounted to the wing shaft, and which transmits reciprocating motion of the measuring diaphragm as rotational motion of the wing shaft, and
such an arrangement is made that a major axis direction of the measuring diaphragm and a longitudinal direction of the rotational arm are parallel to each other or form an acute angle.

9. A gas meter according to claim 8, wherein
four corners of the common portion are rounded.

10. A gas meter according to claim 7, wherein
four corners of the common portion are rounded.

11. A diaphragm gas meter comprising:
a gas meter housing which has an inflow port for gas and an outflow port for gas;
first and second measuring chambers which are provided inside the gas meter housing and have two gas chambers;
a first valve mechanism which alternately supplies gas introduced from the inflow port into the two gas chambers of the first measuring chamber;
a second valve mechanism which alternately supplies gas introduced from the inflow port into the two gas chambers of the second measuring chamber;
a first elliptical measuring diaphragm which is provided between the two gas chambers of the first measuring chamber and partitions the gas chambers from each other in an air tight manner; and
a second elliptical measuring diaphragm which is provided between the two gas chambers of the second measuring chamber and partitions the gas chambers from each other in an air tight manner;
a first interlocking mechanism which interlocks reciprocating motion of the first measuring diaphragm with the second valve mechanism and an integrating mechanism which measures a flow rate of gas; and
a second interlocking mechanism which interlocks reciprocating motion of the second measuring diaphragm with the first valve mechanism and the integrating mechanism.

12. A diaphragm gas meter comprising:
a gas meter housing which has an inflow port for gas and an outflow port for gas;
first and second measuring chambers which are provided inside the gas meter housing and have two gas chambers;
a first valve mechanism which alternately supplies gas introduced from the inflow port into the two gas chambers of the first measuring chamber;
a second valve mechanism which alternately supplies gas introduced from the inflow port into the two gas chambers of the second measuring chamber;
a first measuring diaphragm which is provided between the two gas chambers of the first measuring chamber to partition the gas chambers from each other in an air tight manner, and has, as a shape, a common portion constituted of overlapping portions of two ellipses defined by overlapping the ellipses with each other so as to cross longitudinal axes thereof;
a second measuring diaphragm which is provided between the two gas chambers of the second measuring chamber to partition the gas chambers from each other in an air tight manner, and has, as a shape, a common portion constituted of overlapping portions of two ellipses defined by overlapping the ellipses with each other so as to cross longitudinal axes thereof;

a first interlocking mechanism which interlocks reciprocating motion of the first measuring diaphragm with the second valve mechanism and an integrating mechanism which measures a flow rate of gas; and a second interlocking mechanism which interlocks reciprocating motion of the second measuring diaphragm with the first valve mechanism and the integrating mechanism.

13. A diaphragm gas meter comprising a gas meter housing which has an inflow port for gas and an outflow port for gas;

first and second measuring chambers which are provided inside the gas meter housing and have two gas chambers:

a first valve mechanism which alternately supplies gas introduced from the inflow port into the two gas chambers of the first measuring chamber;

a second valve mechanism which alternately supplies gas introduced from the inflow port into the two gas chambers of the second measuring chamber;

a first measuring diaphragm which is provided between the two gas chambers of the first measuring chamber to partition the gas chambers from each other in an air tight manner, and has, as a shape, as a common portion constituted of overlapping portions of an ellipse and a circle, the circle having a diameter which is longer than a minor axis of the ellipse and shorter than a major axis thereof, which are defined by crossing the ellipse and the circle in an overlapping manner;

a second measuring diaphragm which is provided between the two gas chambers of the second measuring chamber to partition the gas chambers from each other in an air tight manner, and has, as a shape, as a common portion constituted of overlapping portions of an ellipse and a circle, the circle having a diameter which is longer than a minor axis of the ellipse and shorter than a major axis thereof, which are defined by crossing the ellipse and the circle in an overlapping manner;

a first interlocking mechanism which interlocks reciprocating motion of the first measuring diaphragm with the second valve mechanism and an integrating mechanism which measures a flow rate of gas; and a second interlocking mechanism which interlocks reciprocating motion of the second measuring diaphragm with the first valve mechanism and the integrating mechanism.

* * * * *